United States Patent [19]
Johnson

[11] Patent Number: 5,916,113
[45] Date of Patent: Jun. 29, 1999

[54] CROP HEADER WITH ROTARY CONVEYOR ARRAY

[75] Inventor: Orlin W. Johnson, Geneseo, Ill.

[73] Assignee: Case Corporation, Racine, Wis.

[21] Appl. No.: 08/784,473

[22] Filed: Jan. 17, 1997

[51] Int. Cl.[6] ............................. A01D 45/02; A01D 57/22
[52] U.S. Cl. ......................... 56/94; 56/73; 56/89; 56/99; 56/119
[58] Field of Search .................................. 56/94, 57, 62, 56/65, 59, 66, 73, 74, 75, 77, 78, 80, 81, 82, 84, 86, 88, 89, 92, 93, 96, 98, 99, 109, 119

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,528,233 | 9/1970 | Martner et al. . |
| 3,528,234 | 9/1970 | Kowalik et al. . |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. . |
| 4,211,059 | 7/1980 | Decsene ...................................... 56/94 |
| 4,227,368 | 10/1980 | Mossman et al. . |
| 4,269,017 | 5/1981 | deBuhr et al. . |

(List continued on next page.)

FOREIGN PATENT DOCUMENTS

| | | | |
|---|---|---|---|
| 2369785 | 7/1978 | France | ........................................ 56/94 |
| 2848450 | 5/1979 | Germany | ................................... 56/94 |

OTHER PUBLICATIONS

*Farm Show*, vol. 20, No. 5, 1996—"Build–It–Yourself" Narrow Row Header Kit.

*Farm Industry News*, vol. 29, No. 11, 1996 —"Does Narrow Row Corn Add Up?".

*Ontario Farmer*, vol. 29, No. 40, 1996—"Thinking 15–Inch".

1000 Series Corn Head, Operators Manual, 1995 Case Corporation.

1000 Series Corn Head, Parts Catalog, 1993 Case Corporation.

Allis–Chalmers Tractor Division–Milwaukee, U.S.A., "1918–1960, An Informal History", Copyright 1989 by Alan C. King.

Operators Manual, Setting Up Instructions, "McCormick 34HM–21 Corn Snapper (Two Row, Mounted Type)", International Harvester Company (Date Unknown).

Instruction Manual and Parts List, "Snapping Unit Frame Field Improvement Parts for McCormick–Deering, No. 14P, No. 24, Corn Pickers", International Harvester Company (Date Unknown).

CP–8 McCormick Parts Catalog, "34HM–20 Corn Picker, 34HM–21 Corn Snapper, 34HM–22 Sweet Corn Picker (Two–Row, Mounted–Type)", International Harvester Company (Date Unknown).

*Primary Examiner*—Terry Lee Melius
*Attorney, Agent, or Firm*—Foley & Lardner

[57] ABSTRACT

A crop header for a harvesting machine including a frame and a plurality of rotary conveyors cooperatively supported by the frame along a first axis. The plurality of rotary conveyors pass crops between consecutive conveyors along the first axis.

26 Claims, 4 Drawing Sheets

U.S. PATENT DOCUMENTS

| | | |
|---|---|---|
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,528,887 | 6/1996 | Nagy et al. . |

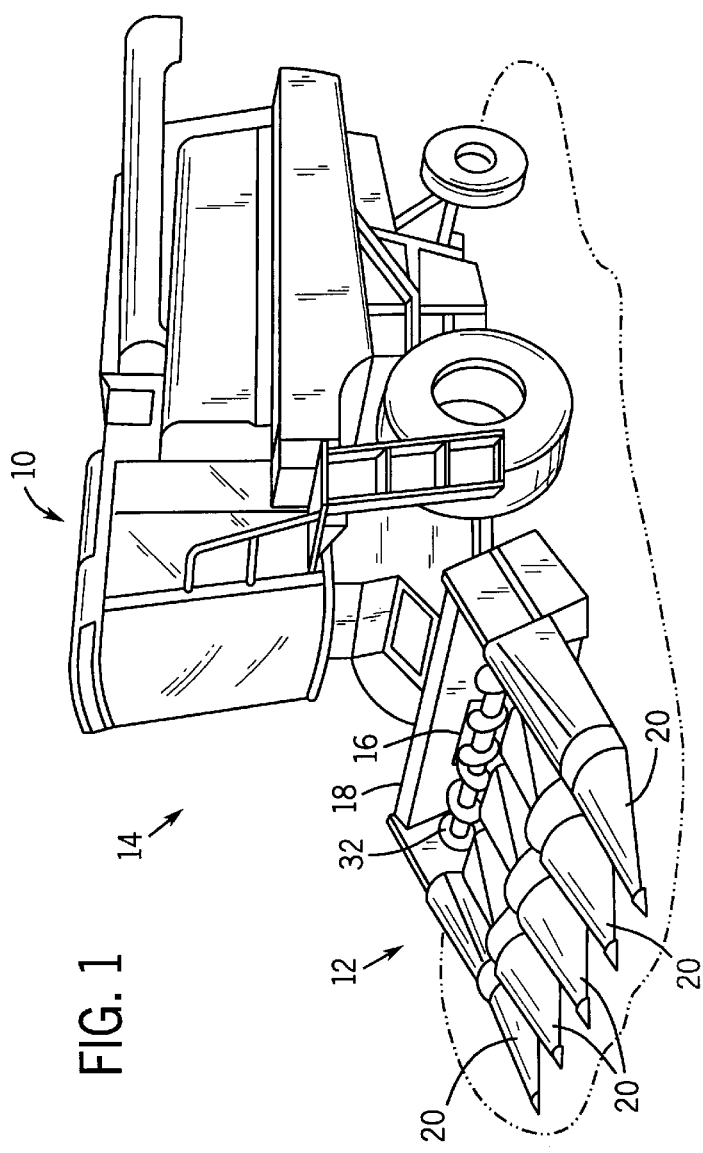
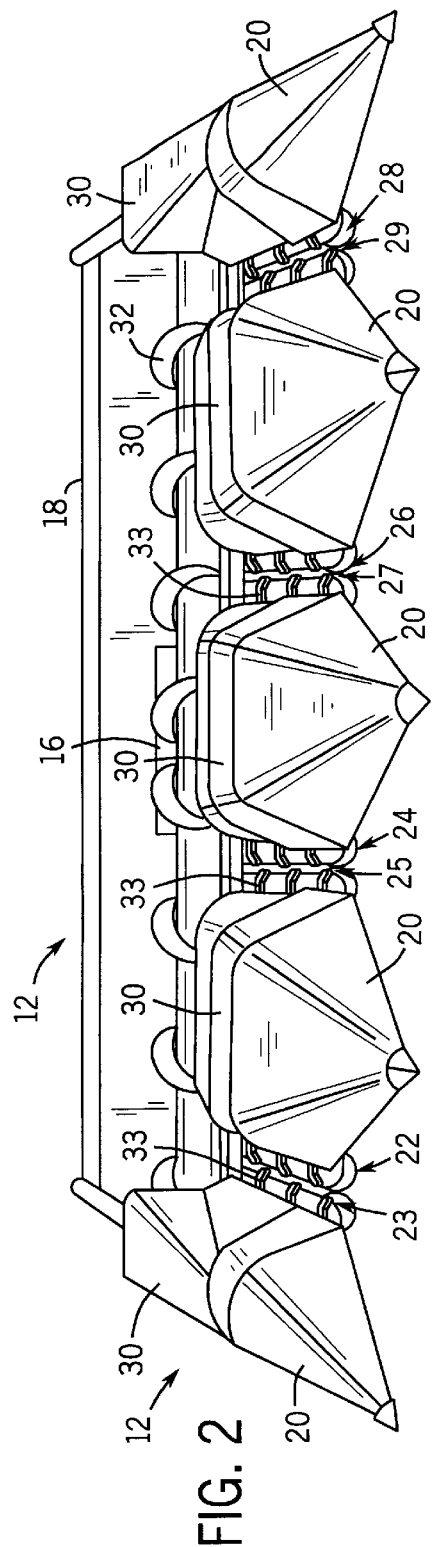

CROP HEADER WITH ROTARY CONVEYOR ARRAY

FIELD OF THE INVENTION

The present invention relates to crop headers for harvesting machines. In particular, the present invention relates to a crop header having a plurality of rotary conveyors cooperatively supported along an axis so as to pass crops between consecutive conveyors along the axis.

BACKGROUND OF THE INVENTION

Several variations of header units are commonly used in combines or harvesting machines for harvesting row crops such as corn and cotton. One such header unit is a corn head with fixed spacing between the row units. Several other corn heads allowing variable spacing between the row units have also been developed. However, both fixed and variable spacing corn heads are designed to only efficiently harvest corn planted in rows having a row width of greater than 20 inches.

Recent research on the spacing of corn rows has indicated special benefits for narrower row spacings that are 12–16 inches apart. In addition to the obvious increase in yield and crop population, these benefits include improved erosion control and better weed control. Narrower rows also require less chemicals and pesticides per unit of yield, thereby benefitting the environment.

Unfortunately, existing header units are not designed to harvest rows having a spacing of 16 inches or less. Moreover, modifying existing header units to effectively harvest rows having spacing of 16 inches or less is difficult, if not impossible. The ability to modify existing header units for row widths of less than 16 inches is inherently limited by the size of row unit components. For example, row units typically include gatherers adapted for contacting and moving corn ears or other harvested crop into the header unit. The conventionally required spacing of the gatherers limits constructing row units closer together for harvesting rows of crops having a spacing of less than 16 inches. Consequently, existing header units are very wasteful and inefficient in harvesting narrow rows leading to a sub-optimal harvesting efficiency.

SUMMARY OF THE INVENTION

A crop header for a harvesting machine includes a frame and a plurality of rotary conveyors cooperatively supported by the frame along a first axis. The plurality of rotary conveyors pass crops between consecutive conveyors along the first axis.

In one preferred embodiment, the rotary conveyor includes a hub portion radially coupled to the frame for rotation about a second axis, a rotary actuator coupled to the hub portion for rotating the rotary conveyor and at least one crop conveying surface outwardly extending from the second axis. Preferably, each rotary conveyor includes a plurality of protuberances extending outwardly approximately 360° about the second axis.

In another preferred embodiment, the plurality of rotary conveyors includes a first plurality of rotary conveyors on a first side of the first axis and a second plurality of conveyors on a second side of the first axis. Preferably, each of the first plurality of conveyors are offset from each of the second plurality of rotary conveyors. At least one of the first plurality of conveyors preferably overlaps at least one of the second plurality of conveyors along the first axis.

In yet another preferred embodiment, the crop header additionally includes a second plurality of rotary conveyors supported by the frame adjacent the first plurality of rotary conveyors along a second axis spaced from the first axis. Preferably, each of the second plurality of conveyors is offset from each of the first plurality of conveyors. At least one of the second plurality of conveyors preferably at least partially overlaps at least one of the first plurality of conveyors along an intermediate axis.

In the most preferred embodiment, the crop header includes a plant portion separating mechanism supported by the frame along the first axis. The plant portion separating mechanism separates a plant portion from a respective plant stalk. In the most preferred embodiment, the plant portion separating mechanism preferably includes at least one stripper plate supported by the frame along the first axis and at least one stalk roll supported by the frame along the first axis proximate said at least one stripper plate. The stalk rolls pull the plant stalk into engagement with the stripper plate to separate the plant portion from the respective plant stalk.

BRIEF DESCRIPTION OF THE DRAWINGS

FIG. 1 is a perspective view of a harvesting machine including a header of the present invention.

FIG. 2 is a front perspective view of the header including rotary conveyors.

DETAILED DESCRIPTION OF THE PREFERRED EMBODIMENTS

Figure 3:
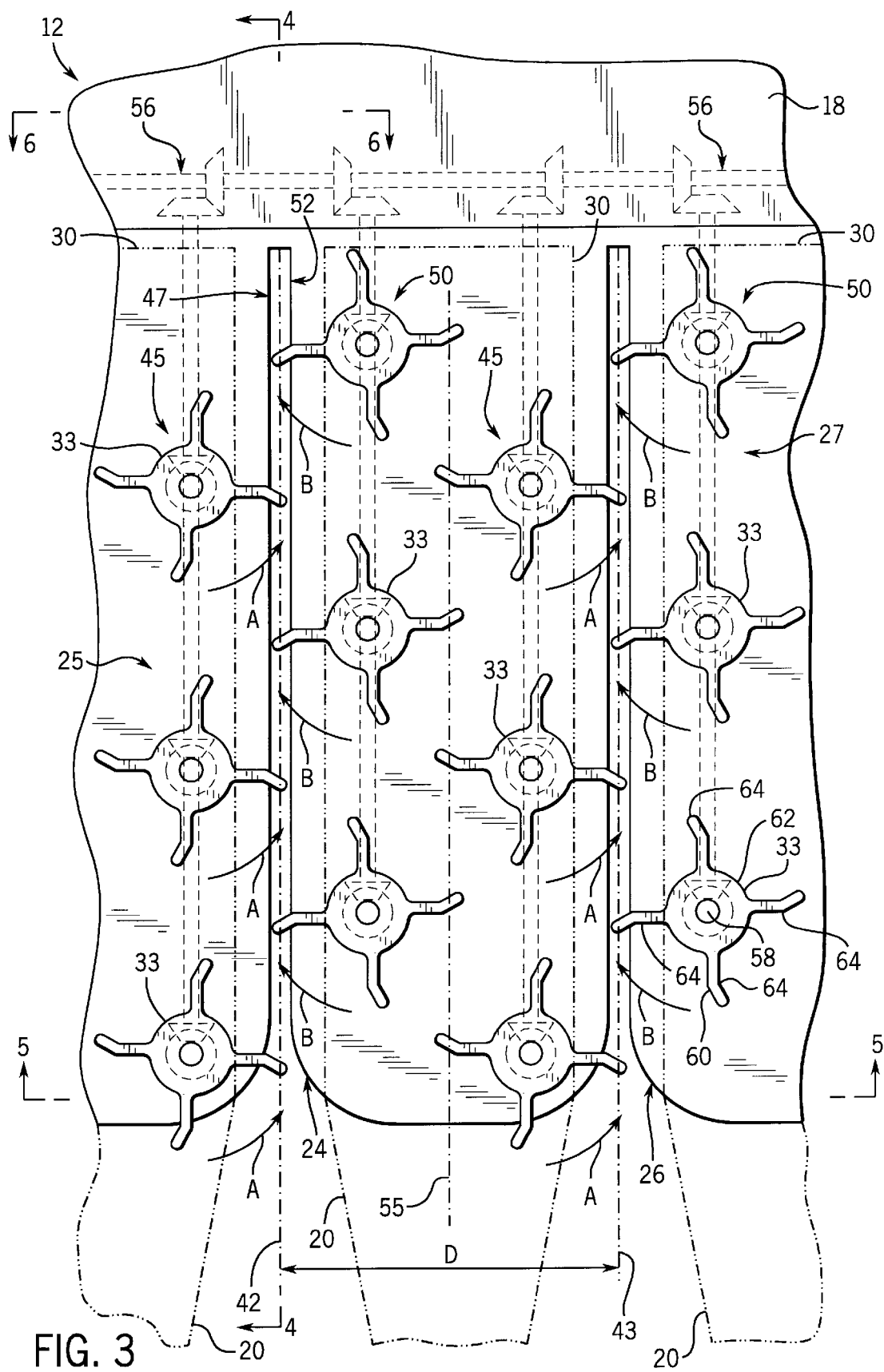
FIG. 3 is a fragmentary sectional view of the header of FIG. 2.

FIGS. 1 and 2 illustrate harvesting machine 10 including header 12. FIG. 1 is a perspective view illustrating harvesting machine 10 with header 12. FIG. 2 is a front perspective view illustrating header 12 in greater detail. As shown by FIG. 1, harvesting machine 10 comprises a conventionally known combine having a front end 14 configured for mounting header 12 and for receiving harvested crops from header 12 through a central intake 16. As conventionally known, combine 10 includes a threshing mechanism for separating the grain or seeds from the remaining straw and chaff. Alternatively, header 12 may be used with a variety of other harvesting machines used for harvesting crops such as corn pickers and the like.

As shown by FIG. 2, header 12 is a row crop harvesting head designed for harvesting multiple crop rows. In the preferred embodiment illustrated, header 12 is a corn head designed for removing ears of corn from the respective stalks and for conveying the removed ears of corn to the central intake 16 of harvesting machine 10. Header 12 generally includes frame 18, divider shields 20, row units 22, 24, 26, 28, rotary conveyor arrays 23, 25, 27, 29, conveyor shields 30 and cross conveyor 32. Frame 18 is a generally rigid, elongate support structure configured for being mounted to forward end 14 of harvesting machine 10 and for supporting row units 22, 24, 26, 28, rotary conveyor arrays 23, 25, 27, 29 and cross conveyor 32, as well as other components of header 12. As can be appreciated, frame 18 may have a variety of alternative sizes and configurations depending upon the type of harvesting machine to which header 12 is attached, the particular type of crops being harvested and the number of row units supported by frame 18.

Divider shields 20 are conventionally known and extend forward in between adjacent row units 22, 24, 26, 28. In the preferred embodiment illustrated, divider shields 20 comprise semi-conical shaped members having noses pointing forward of header 12. Divider shields 20 are supported by frame 18 proximate to the ground surface for lifting corn stalks above the ground surface and for channeling or funneling the corn rows to an intermediate row unit 22, 24, 26 or 28.

Row units 22, 24, 26, 28 are supported by frame 18 between adjacent or consecutive divider shields 20 transversely across header 12. In the preferred embodiment illustrated, row units 22, 24, 26, 28 are closely spaced across header 12. Preferably, row units 22, 24, 26, 28 are spaced apart from one another by a distance no greater than 16 inches for enabling row units 22, 24, 26, 68 to harvest narrower row crops with increased harvesting efficiency. Each row unit 22, 24, 26, 28 longitudinally extends rearwardly from divider shield 20 toward cross conveyor 32. Each row unit 22, 24, 26, 28 is designed for receiving corresponding rows of corn channeled by divider shields 20 and for removing the ears of corn from their respective stalks.

Rotary conveyor arrays 23, 25, 27, 29 are mounted to frame 18 and are positioned adjacent to and along the rearwardly extending axes of row units 22, 24, 26, 28, respectively. In particular, rotary conveyor array 23 is positioned along row unit 22. Rotary conveyor array 25 is positioned along row unit 24. Rotary conveyor array 27 is positioned along row unit 26. Lastly, rotary conveyor array 29 is positioned along row unit 28. Each rotary conveyor array 23, 25, 27, and 29 includes a plurality of individual rotary conveyors 33 supported and positioned along row units 22, 24, 26 and 28 so as to carry and pass crops to be harvested from a first consecutive rotary conveyor to a second consecutive adjacent rotary conveyor along the longitudinal axis of the row unit. As a result, the plurality of individual rotary conveyors 33 of each rotary conveyor array 23, 25, 27 and 29 cooperate with one another to pass crops from a forward end of each row unit proximate divider shields 20 towards cross conveyor 32 and central intake 16. In the preferred embodiment illustrated, each rotary conveyor array 23, 25, 27, 29 includes a plurality of rotary conveyors 33 supported by frame 18 along opposite sides of each row unit 22, 24, 26, 28. Alternatively, each rotary conveyor array 23, 25, 27, 29 includes a plurality of individual rotary conveyors 33 extending along a single side of a row unit, but positioned so as to also pass the crop to be harvested from a first consecutive adjacent rotary conveyor to a second consecutive adjacent rotary conveyor along the axis of the row unit.

Cross conveyor 32 preferably comprises an elongate auger rotably mounted at opposite ends to frame 18. Cross conveyor 32 transversely extends across and adjacent to ends of rotary conveyor arrays 23, 25, 27, 29 so as to receive the corn ears conveyed by rotary conveyor arrays 23, 25, 27, and 29. Upon being rotated by conventional drive mechanism, cross conveyor 32 conveys the ears of corn from rotary conveyor arrays 23, 25, 27, 29 to the central intake 16 of harvesting machine 10. Although cross conveyor 32 is illustrated as an auger having oppositely wound vanes for conveying the ears of corn to intake 16, cross conveyor 32 may alternatively comprise any one of a variety of well-known conveying mechanisms such as moving webs or paddles, and the like. As can be appreciated, cross conveyor 32 may be omitted in headers having a limited number of row units and a reduced width.

FIG. 3 is a fragmentary top elevational view of header 12 with divider shields 20 and conveyor housing 30 removed for purposes of illustration. FIG. 3 illustrates rotary conveyor arrays 25 and 27 in greater detail. Rotary conveyor arrays 23 and 29 are substantially identical to rotary conveyor arrays 25 and 27 but extend along the longitudinal axes of row units 22 and 28, respectively. As best shown by FIG. 3, row units 24 and 26 extend generally parallel to and along longitudinal axes 42 and 43, respectively. Longitudinal axes 42 and 43 generally extend from divider shields 20 towards cross conveyor 32 (shown in FIGS. 1 and 2). In the preferred embodiment illustrated, crop rows are funneled or channeled by divider shields 20 to row units 24 and 26 along axes 42 and 43. Axes 42 and 43 are transversely separated by a distance D. In the preferred embodiment illustrated, the distance D between consecutive row units is less than 20 inches and preferably less than or equal to 16 inches.

As further shown by FIG. 3, rotary conveyor arrays 25 and 27 are supported by frame 18 adjacent to and along row units 24 and 26, respectively, and axes 42 and 43, respectively. Each rotary conveyor array 25, 27 includes a plurality of individual rotary conveyors 33 cooperatively supported by frame 18 along the longitudinal axis and the row unit so as to pass crops between consecutive adjacent rotary conveyors along the longitudinal axis. In the preferred embodiment illustrated, rotary conveyor array 25 includes a first row 45 of rotary conveyors 33 positioned along a first side 47 of axis 42 and a second row 50 of rotary conveyors 33 extending along a second side 52 of axis 42. Each rotary conveyor 33 of rows 45 and 50 is rotated at an appropriate speed and in an appropriate direction by drive mechanism 56 (shown in detail in FIGS. 4–6) so as to pass crops between rotary conveyors 33 from crop shields 20 rearwardly towards cross conveyor 32 (shown in FIGS. 1 and 2). In the preferred embodiment illustrated, each rotary conveyor 33 of row 45 is spaced sufficiently close to an adjacent rotary conveyor 33 of row 50 and is rotated at a sufficient speed and direction so as to pass crops to an adjacent consecutive rearwardly positioned rotary conveyor 33 of row 50. In the preferred embodiment illustrated, rotary conveyors 33 of row 45 rotate in a counter-clockwise direction as indicated by arrows A while rotary conveyors 33 of row 50 rotate in a clockwise direction as indicated by arrows B.

As further shown by FIG. 3, each rotary conveyor 33 of row 45 is equidistantly spaced from adjacent rotary conveyor 33 of row 45. Similarly, each rotary conveyor 33 of row 50 is equidistantly spaced from an adjacent rotary conveyor 33 of row 50. The spacing between rotary conveyors 33 of row 45 is preferably offset from the spacing between rotary conveyors 33 of row 50 along axis 42. Because each of rotary conveyors 33 of row 45 are offset relative to each of rotary conveyors 33 of row 50 along axis 42, rotary conveyors 33 of row 45 may actually overlap rotary conveyors 33 of row 50 along axis 42 without interfering with rotary conveyors 33 of row 50 and without the complex rotational timing of rotary conveyors 33 to avoid interference. Because rotary conveyors 33 of rows 45 and 50 are supported by frame 18 in a partially overlapping arrangement along axis 42, rows 45 and 50 are supported by frame 18 closer to one another along axis 42 to reduce the distance D between axes 42 and 43 and between row units 24 and 26. As a result, row units 24 and 26 may be supported by frame 18 closer to one another to better accommodate narrower crop row spacings for improved harvesting efficiency.

Rotary conveyor array 27 is substantially identical to rotary conveyor array 25 except that rotary conveyor array 27 extends along axis 43 and along row unit 26. For ease of illustration, those elements of rotary conveyor array 27 which are similar to those elements of rotary conveyor array 25 are numbered similarly. As shown by FIG. 3, rotary conveyor row 45 of rotary conveyor array 27 is supported by frame 18 along axis 43 adjacent to rotary conveyor row 50 of rotary conveyor array 25. The spacing between each rotary conveyor 33 of row 45 of array 27 is offset relative to the spacing between each conveyor 33 of row 50 of array 25. Each rotary conveyor 33 of row 45 of array 27 extending along axis 43 is offset relative to adjacent consecutive rotary conveyors 33 of row 50 of array 25. In the preferred embodiment illustrated, rotary conveyors 33 of row 45 of array 27 are supported by frame 18 so as to partially overlap rotary conveyors 33 of row 50 of array 25 along a longitudinal axis 55 intermediately extending between rows 45 and 50 of arrays 27 and 25, respectively. As a result, rows 45 and 50 of arrays 27 and 25, respectively, are supported by frame 18 closer to one another along axis 55 to reduce the distance D between axes 42 and 43 and between row units 24 and 26 to better accommodate narrower crop row spacings with improved harvesting efficiency. Although row 50 of array 25 is illustrated as partially overlapping rows 45 of both arrays 25 and 27, header 12 may alternatively be configured such that row 50 of array 25 partially overlaps row 45 of only one or the other of arrays 25 and 27 to reduce the distance D between axes 42 and 43. Although not specifically illustrated, rotary conveyor arrays 23 and 29 are substantially identical to rotary conveyors arrays 25 and 27 illustrated in detail.

In the preferred embodiment illustrated in FIG. 3, each rotary conveyor 33 rotates about an axis 58 and includes at least one crop conveying surface 60. Crop conveying surface 60 rotates about axis 58 to engage and carry crops rearwardly along the adjacent axis toward cross conveyor 32 and harvesting machine 10 (shown in FIGS. 1 and 2). In the preferred embodiment illustrated, each rotary conveyor 33 preferably comprises a paddle wheel having a hub portion 62 and a plurality of protuberances or fingers 64. Hub portion 62 is a central member or portion interconnecting fingers 64 and rotably coupling protuberances 64 to frame 18 about axis 58.

Protuberances 64 extend outwardly from hub portion 62 and define crop conveying surfaces 60. Preferably, protuberances 64 radially extend outwardly from hub 62 about axis 58. In the preferred embodiment illustrated, protuberances 64 comprise four equidistantly spaced paddles extending 360° about axis 58. Alternatively, rotary conveyor 33 may include any number of protuberances 64 with various spacings about hub 62 and with various shapes and configurations for defining at least crop conveying surface. Moreover, although it has been discovered that the paddle wheel configuration of rotary conveyors 33 effectively rotates to pass crops rearwardly along a longitudinal axes, each crop conveyor 33 may have a variety of alternative shapes and configurations so long as each rotary conveyor 33 rotates about an axis 58 and provides a surface for engaging crops and passing crops rearwardly upon rotation of the rotary conveyor 33. For example, rotary conveyors 33 may alternatively be star-shaped, triangular, octagonal, rectangular, or lobed.

Figure 4:
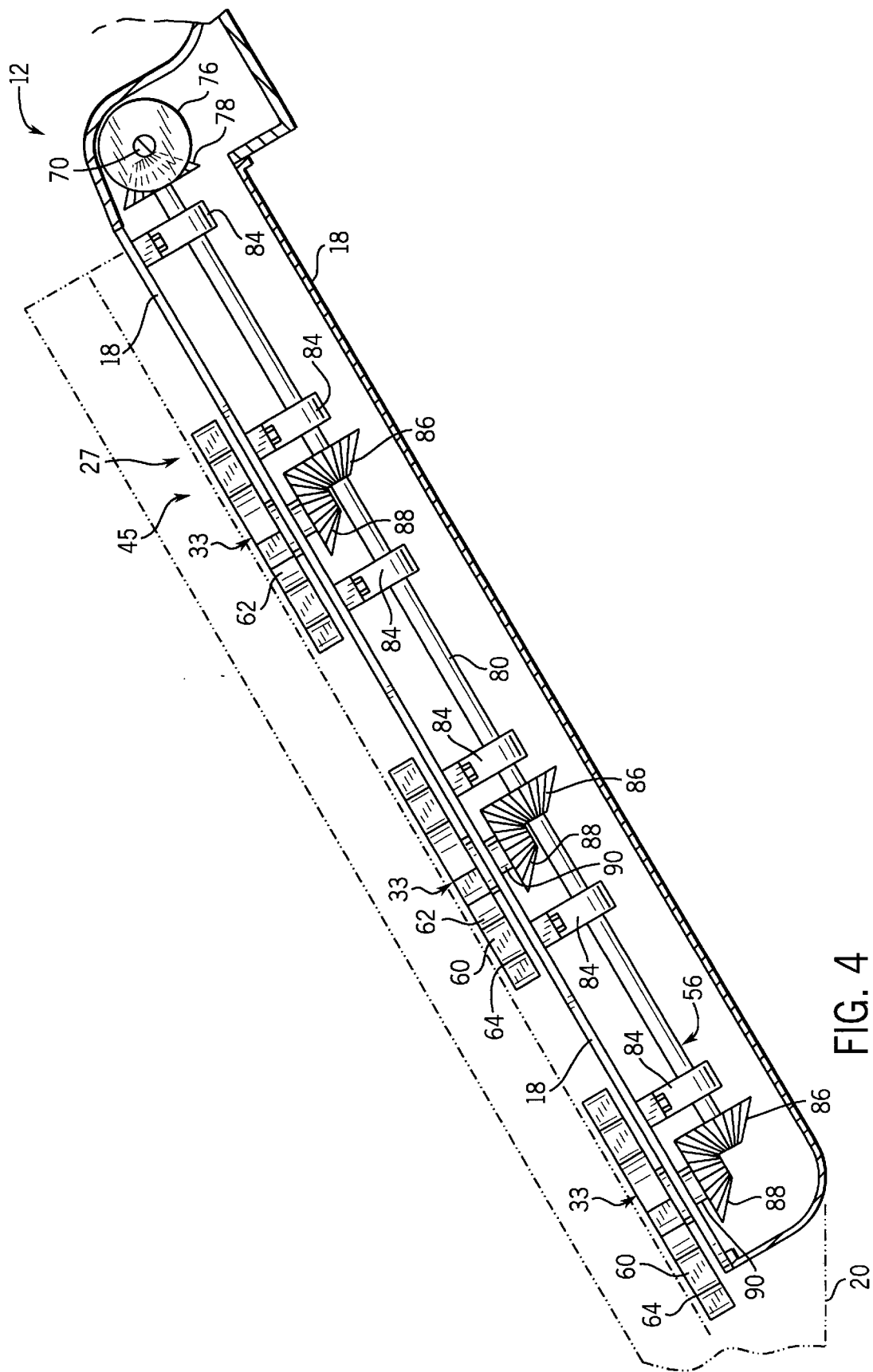
FIG. 4 is a sectional view of the header taken along lines 4—4 of FIG. 3.
Figure 5:
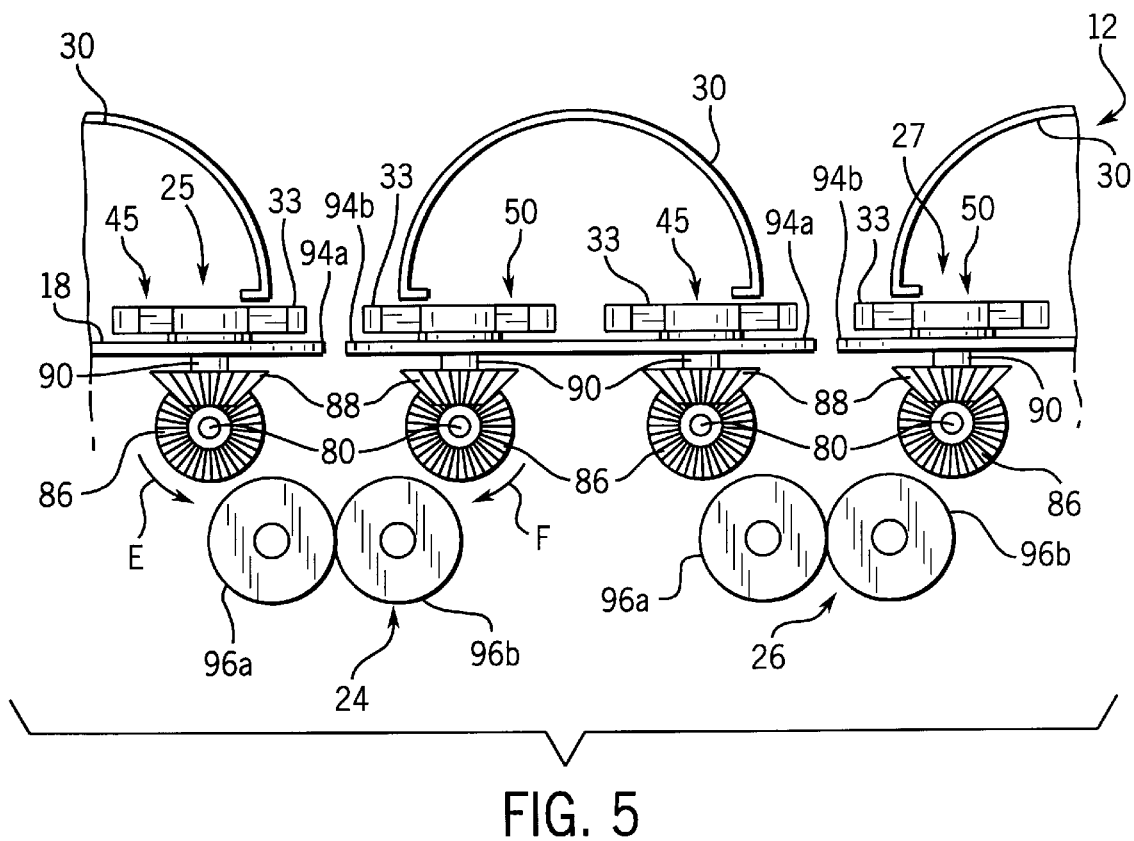
FIG. 5 is a sectional view of the header taken along lines 5—5 of FIG. 3.
Figure 6:
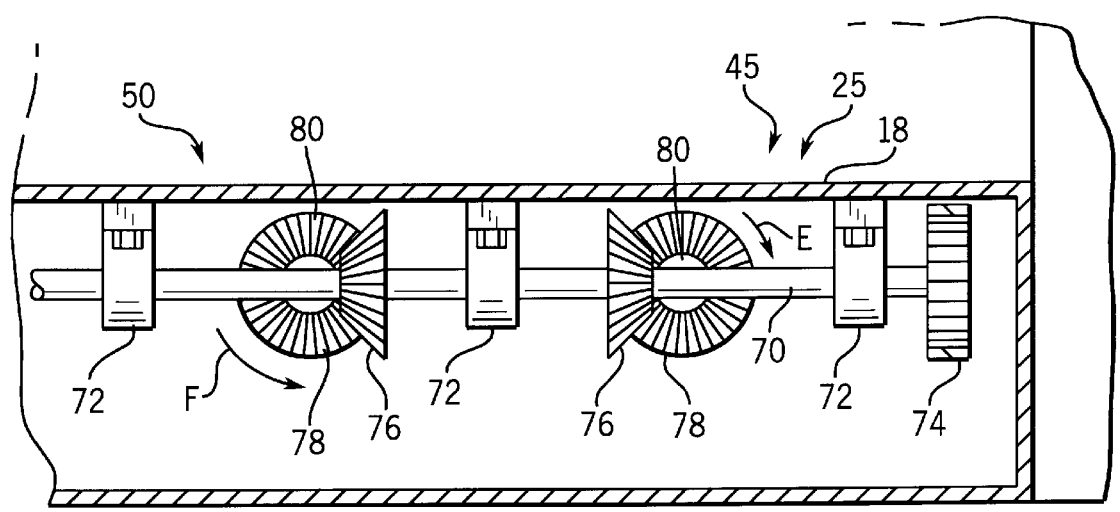
FIG. 6 is a fragmentary section of the header taken along lines 6—6 of FIG. 3.

FIGS. 4–6 illustrate drive mechanism 56 used for rotating conveyors 33 in greater detail. FIG. 5 additionally illustrates the preferred embodiments of row units 24, 26 and rotary conveyors 33 of arrays 25 and 27 in greater detail. As shown by FIGS. 4–6, drive mechanism 56 includes main drive shaft 70, journal supports 72, spur gear 74, bevel gears 76, 78, rotary conveyor row drive shaft 80, journal supports 84, rotary conveyor bevel gears 86, 88 and rotary conveyor coupling shafts 90. Main drive shaft 70 is an elongate axle rotatably coupled to frame 18 by journal supports 72 transverse to each drive shaft 80. Drive shaft 70 receives torque from spur gear 74 to rotate bevel gears 76 for transmitting torque to drive shaft 80.

Spur gear 74 is fixedly coupled to drive shaft 70 and engages a spur gear (not shown) forcefully coupled to a drive shaft of cross conveyor 32 (shown in FIGS. 1 and 2). Spur gear 74 appropriately transmits torque from the conventionally known drive mechanism of cross conveyor 32 to drive shaft 70. As can be appreciated, drive shaft 70 may alternatively receive torque from a variety of alternative drive shafts and mechanisms of header 12 using various devices. For example, drive shaft 70 may alternatively receive power from drive mechanisms used to apply power to each row unit or other power mechanisms. Moreover, in lieu of spur gear 74, power may transmitted to drive shaft 70 by other mechanisms such as a belt driven sheave mechanism.

Bevel gears 76 and 78 transmit torque from main drive shaft 70 to each rotary conveyor row drive shaft 80. Bevel gear 76 is fixedly coupled to drive shaft 70 while bevel gear 78 is fixedly coupled to a rotary conveyor row drive shaft 80. Bevel gears 76 and 78 engage one another to transmit torque from shaft 70 to each row drive shaft 80. As shown by FIG. 6, bevel gears 76 are appropriately positioned so as to rotate bevel gear 78 and its corresponding shaft 80 in an appropriate direction to similarly rotate rotary conveyors 33 in an appropriate direction along each row unit.

As shown by FIG. 4, each row drive shaft 80 is an elongate shaft longitudinally extending parallel to each row unit. Each row drive shaft 80 is rotatably coupled to frame 18 by journal supports 84. Each row drive shaft 80 is additionally fixedly coupled to bevel gears 86.

Bevel gears 86 are fixedly coupled to row drive shafts 80 and engage bevel gears 88 to transmit torque from row drive shaft 80 to bevel gears 88. Bevel gears 88 are secured to an end of each shaft 90 which extends from bevel gear 88 to hub portion 62 of each rotary conveyor 33. In the embodiment illustrated, row drive shaft 80 of row 45 of array 25 rotates in the direction indicated by arrows E to rotate each rotary conveyor 33 of row 45 of array 25 in a direction for conveying crops from divider shield 20 rearwardly from divider shield 20 towards cross conveyor 32 (shown in FIGS. 1 and 2). Similarly, row drive shaft 80 of row 50 of array 25 is rotated in the direction indicated by arrows F so as to rotate rotary conveyors 33 of row 50 of array 25 in a direction for conveying crops rearwardly from divider shield 20 towards cross conveyor 32. Rotary conveyors 33 of arrays 23, 27, and 29 are similarly driven by drive mechanism 56. As can be appreciated, rotary conveyors 33 may be rotated by a variety of rotary actuators including worm gears, belt driven sheave assemblies, and the like.

FIG. 5 illustrates row units 24 and 26 in greater detail. As is shown by FIG. 4, row units 24 and 26 each include stripper plates 94a, 94b and snapping or stalk rolls 96a, 96b. Stripper plates 94a, 94b generally comprise elongate flat plates or bars supported by frame 18 along a length of each row unit. Stripper plates 94a, 94b are spaced opposite one another for receiving corn stalks therebetween. Stripper plates 94a, 94b are preferably adjustable for varying the space in between stripper plates 94a, 94b to accommodate various harvesting conditions.

Stalk rolls 96a, 96b are rotatably supported by frame 18 below stripper plates 94a, 94b, respectively. Stalk rolls 96a, 96b are conventionally known and are rotatably coupled to frame 18 below stripper plates 94a, 94b. Upon being oppositely rotated by a drive mechanism (not shown) in a conventionally known manner, stalk rolls 96a, 96b engage corn stalks to move the corn stalks toward and between stripper plates 94a, 94b. Stalk rolls 96a, 96b additionally drag and pull the cornstalks downward between stripper plates 94a, 94b to strip ears of corn from the cornstalks. Removed ears of corn are then conveyed by rotary conveyor arrays 25 and 27 rearwardly toward cross conveyor 32 (as shown in FIGS. 1 and 2). Row units 22 and 28 are substantially identical to row units 24 and 26 illustrated.

Overall, rotary conveyor arrays 23, 25, 27, and 29 enable row units 22, 24, 26, and 28 to be spaced more closely together for accommodating narrower crop row spacings with high degrees of harvesting efficiency. Because rotary conveyor arrays 23, 25, 27, and 29 convey ears of corn removed by row units 22, 24, 26 and 28 to cross conveyor 32, the large, complicated and space consuming gatherer units typically employed in conventional corn heads and other harvesting heads are not required. Moreover, because each individual rotary conveyor 33 includes protuberances 64 which rotate about in an axis independent of other rotary conveyors 33, the time consuming and expensive chain adjustment typically required of conventional gatherer units to maintain proper chain tension is eliminated. Because rotary conveyors 33 are offset from one another so as to permit partial overlapping, the width between the row units is reduced. This reduced required spacing between in between row units enables header 12 to harvest crops planted in narrower crop rows.

Although the present invention has been described with reference to preferred embodiments, workers skilled in the art will recognize that changes may be made in form and detail without departing from the spirit and scope of the invention.

What is claimed is:

1. A crop header for a harvesting machine, the crop header comprising;

a frame;

at least one divider structure supported by the frame, said at least one divider structure forming a first crop receiving channel extending along the first axis and a second crop receiving channel extending along a second axis spaced from the first axis; and a plurality of rotary conveyors cooperatively supported by the frame alongside the first axis to pass crops between consecutive rotary conveyors along the first axis, wherein the plurality of rotary conveyors includes:

a first plurality of conveyors on a first side of the first axis:

a second plurality of conveyors on a second side of the first axis; and a third plurality of conveyors alongside the second axis, the third plurality of conveyors supported by the frame adjacent the second plurality of conveyors and between the first and second axes, wherein each of the third plurality of conveyors is offset from each of the second plurality of conveyors.

2. The crop header of claim 1 wherein each rotary conveyor includes:

a hub portion rotatably coupled to the frame for rotation about a second axis;

at least one crop conveying surface outwardly extending from the hub about the second axis; and a rotary actuator coupled to the hub portion for rotating the rotary conveyor.

3. The crop header of claim 2 wherein said at least one crop conveying surface includes:

a plurality of crop conveying surfaces outwardly extending from the second axis and spaced 360° about the second axis.

4. The crop header of claim 1 wherein each of the first plurality of conveyors is offset from each of the second plurality of conveyors along the first axis.

5. The crop header of claim 4 wherein at least one of the first plurality of conveyors at least partially overlaps at least one of the second plurality of conveyors along the first axis.

6. The crop header of claim 1 wherein at least one of the third plurality of conveyors at least partially overlaps at least one of the second plurality of conveyors along a third axis intermediate to the third plurality of conveyors and the second plurality of conveyors.

7. The crop conveyor of claim 1 wherein each rotary conveyor comprises a paddle wheel.

8. The crop header of claim 1 including:

a row unit extending along the first axis.

9. The crop header of claim 1, wherein the crop header has a rear end configured for being coupled to the harvesting machine and an opposite front end, and wherein the first crop receiving channel and the second crop receiving channel extend parallel to one another from the front to the rear of the crop header.

10. The crop header of claim 1, wherein the frame has a front end and a rear end and wherein each of the third plurality of conveyors is offset from each of the second plurality of conveyors in a direction extending between the front end and the rear end.

11. A crop header for a harvesting machine, the crop header comprising:

a frame;

a first plurality of rotary conveyors rotatably supported by the frame in a plane along a first side of a first axis; and a second plurality of rotary conveyors rotatably supported by the frame in the plane on a second side of the axis, wherein each of the second plurality of rotary conveyors is offset from each of the first plurality of rotary conveyors alongside the first axis in the plane.

12. The crop header of claim 11 wherein at least one of the first plurality of rotary conveyors at least partially overlaps at least one of the second plurality of conveyors along the first axis.

13. The crop header of claim 11 including:

a plant portion separating mechanism supported by the frame along the first axis for separating a plant portion from a respective plant stalk.

14. The crop header of claim 1 wherein the plant portion separating mechanism includes:

at least one stripper plate supported by the frame along the first axis; and at least one stalk roll supported by the frame proximate said at least one stalk roll along the first axis, wherein said at least one stalk roll pulls a plant stalk into engagement with said at least one stripper plate to separate a plant portion from the respective plant stalk.

15. A crop header of claim 11 including:

a row unit extending along the first axis.

16. The crop header of claim 11 including:

at least one divider structure supported by the frame, said at least one divider structure forming a first crop receiving channel extending along the first axis and a second crop receiving channel extending along a second axis spaced from the first axis; and a third plurality of rotary conveyors supported by the frame along the second axis, the third plurality of conveyors extending adjacent the second plurality of rotary conveyors and between the first and second axes.

17. The crop header of claim 16 wherein each of the third plurality of rotary conveyors are offset from each of the plurality of second rotary conveyors.

18. The crop header of claim 17 wherein at least one of the third plurality of rotary conveyors at least partially overlaps at least one of the second plurality of rotary conveyors.

19. The crop header of claim 16, wherein the crop header has a rear end configured for being coupled to the harvesting machine and an opposite front end, and wherein the first crop receiving channel and the second crop receiving channel extend parallel to one another from the front to the rear of the crop header.

20. A crop header for a harvesting machine, the crop header comprising:

a frame;

at least one divider structure supported by the frame, said at least one divider structure forming a first crop receiving channel extending along a first axis and a second crop receiving channel extending along a second axis spaced from the first axis:

a first plurality of rotary conveyors supported by the frame alongside the first axis and between the first and second crop receiving channels;

a second plurality of rotary conveyors supported by the frame adjacent to the first plurality of rotary conveyors alongside the second axis and between the first and second channels wherein each of the second plurality of rotary conveyors are offset from each of the first plurality of rotary conveyors.

21. The crop header of claim 20, wherein the crop header has a rear end configured for being coupled to the harvesting machine and an opposite front end, and wherein the first crop receiving channel and the second crop receiving channel extend parallel to one another from the front to the rear of the crop header.

22. The crop header of claim 20, wherein the first and second plurality of rotary conveyors are coplanar.

23. The crop header of claim 20 including:

at least one stripper plate supported by the frame along the first axis; and at least one stalk roll supported by the frame proximate said at least one stripper plate along the first axis, wherein said at least one stalk roll pulls a plant stalk into engagement with said at least one stripper plate to separate a plant portion from the respective plant stalk.

24. The crop header of claim 20 wherein at least one of the second plurality of conveyors at least partially overlaps at least one of the first plurality of conveyors along a second axis parallel to the first axis and intermediate to the second plurality of conveyors and the first plurality of conveyors.

25. The crop header of claim 20, wherein the frame has a front end and a rear end, wherein the first plurality of rotary conveyors longitudinally extend between the front end and the rear end, wherein the second plurality of rotary conveyors longitudinally extend between the front end and the rear end and wherein each of the second plurality of rotary conveyors is longitudinally offset from each of the first plurality of rotary conveyors.

26. A crop header for a harvesting machine, the crop header comprising:

a frame having a rear end configured for being coupled to a harvesting machine and an opposite front end;

at least one divider structure supported by the frame, said at least one divider structure forming a first crop receiving channel extending along a first axis and a second crop receiving channel extending along a second axis spaced from the first axis, wherein the first and second crop receiving channels extend parallel to one another from the front end to the rear end of the frame;

a first plurality of rotary conveyors longitudinally extending between the front end and the rear end; and a second plurality of rotary conveyors longitudinally extending between the front end and the rear end, wherein the second plurality of rotary conveyors are longitudinally offset from the first plurality of rotary conveyors.

* * * * *